(No Model.)
C. WAGONER.
COMBINED LINE REEL, FASTENER, AND TIGHTENER.
No. 515,486. Patented Feb. 27, 1894.
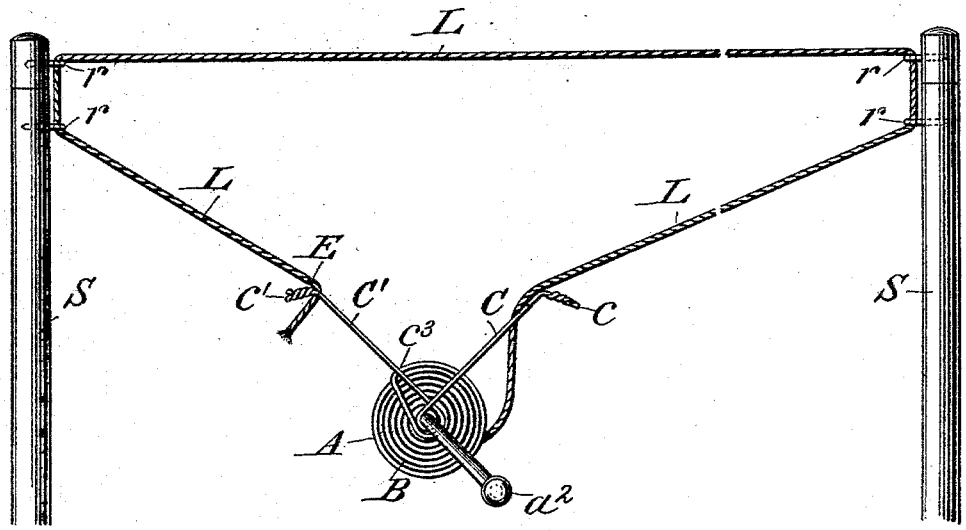
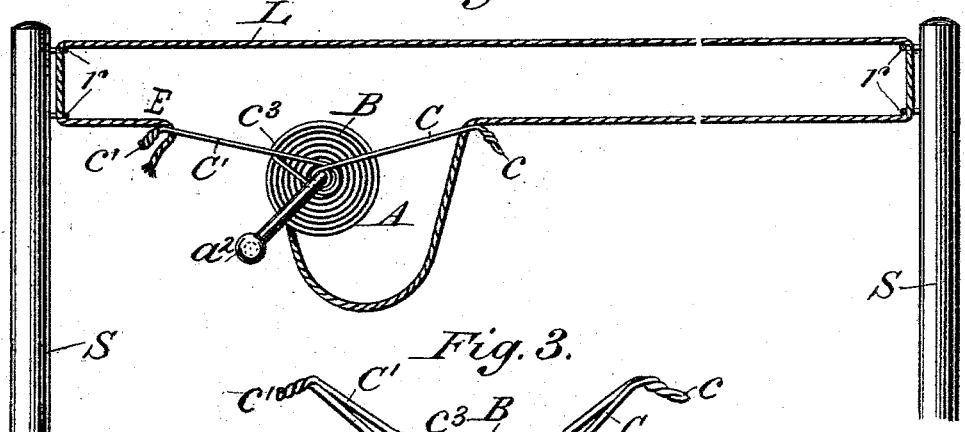
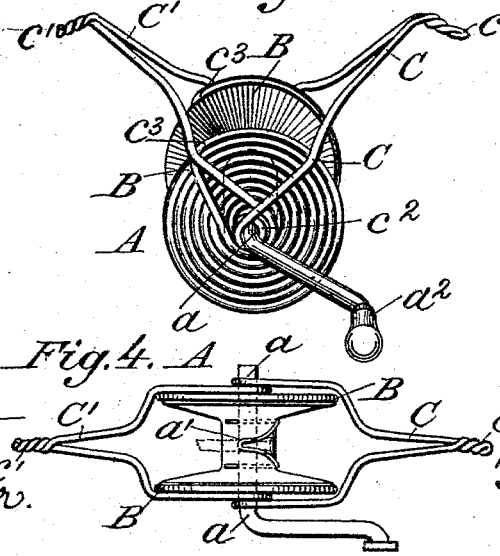
Attest:
F. H. Schott
M. H. Chandler
Inventor
Charles Wagoner
By Grant Burroughs
Atty.

UNITED STATES PATENT OFFICE.

CHARLES WAGONER, OF WORCESTER, NEW YORK.

COMBINED LINE REEL, FASTENER, AND TIGHTENER.

SPECIFICATION forming part of Letters Patent No. 515,486, dated February 27, 1894.

Application filed October 20, 1893. Serial No. 488,735. (No model.)

*To all whom it may concern:*

Be it known that I, CHARLES WAGONER, a citizen of the United States, residing at Worcester, in the county of Otsego and State of New York, have invented certain new and useful Improvements in a Combined Line Reel, Fastener, and Tightener, of which the following is a full, clear, and exact description, such as will enable those skilled in the art to which it appertains to make and use the same, reference being had to the accompanying drawings.

This invention relates to improvements in a combined line reel, fastener and tightener.

It has for its object the construction of such a device whereby a line may be coiled when not in use, or its ends fastened when in use and tightened when desired.

It consists in the novel construction, combination and arrangement of parts such as will be hereinafter fully described, pointed out in the appended claims and illustrated in the accompanying drawings.

In the accompanying drawings, in which similar letters of reference designate corresponding parts, Figure 1 is a side elevation showing the device connecting the ends of a line, the latter being slack. Fig. 2 is a similar view showing the device connecting the ends of the line with the slack taken out. Fig. 3 is a perspective view of the device. Fig. 4 is a plan view.

Referring to the drawings by letter, A designates a reel which may be of any construction suitable in the premises. In the present instance it is represented as being a spool carried on an axle $a$, journaled in the disks B, B. It is provided with a fastener $a'$ whereby the end of the line to be wound can be attached thereto. The axle is provided with a crank and handle $a^2$ for the rotation of the reel. The disks B, B, have substantially the same diameters as the ends of the spool and fit quite closely to the same so that there will be no liability of the line becoming wrapped around the axle between the disks and the spool heads.

Attached to the reel and projecting in opposite directions, are the clips C and C'. These clips are substantially V-shaped and have the apex formed in their outer ends. They serve as a means for securing the ends of the line and also to guide the line when reeled in. The clips are elastically connected with the reel so that they can be bent or moved to a certain extent around the axle of the reel, the connections being such as to normally hold the clips in positions elevated above the horizontal plane of the axis of the reel, so that the unfastening of the line will be facilitated, inasmuch as by depressing the clips a certain amount of slack will be given to the line whereby it can be more readily detached than if the clips were rigid.

In the present instance the clips C and C' and the disks B, B, are formed of a single piece of wire, the latter having the necessary strength and resilience. In constructing the same a piece of wire of the required length is doubled and the bend twisted to form the handle $c$. The wires are then bent to form the clip C, after which the bearings $c^2$, $c^2$, in which the axle $a$ of the reel is journaled, are formed. The wires are then continued to form the disks B, B, which are practically coiled springs. After the last turn of the wires in forming the disks have been made they are bent to form the shoulders $c^3$, $c^3$, the wires continuing toward the center of the disks and looped around the bearings $c^2$, $c^2$, and on their return bear against the shoulders $c^3$, $c^3$. The ends of the wire are then formed into the clip C' and the extreme ends twisted to form the handle $c'$. It is to be observed that the loops in the ends of the clip C' are inside of the ends of the clip C so that the wires will be more firmly held against the shoulders $c^3$, $c^3$.

The invention is illustrated as being applied to a line L supported between two standards S, S. The line passes through the rings $r$, $r$, respectively attached to each standard and has its two ends fastened by means of the device, the free portion of the line being wound upon the reel.

In applying the device, the line, which has been previously wound on the reel, is unwound, as much of it as is needed, and passed through the several connections and the two ends of the line brought together. One of the ends, as E, is attached to one of the clips, as C', the other end being attached to the reel. The reel is then turned and the line tightened to any desired extent and the free end of the line is forced into the clip C. By this means the line is readily and easily fastened and stretched to any desired extent and the free end not in use can be wound on the reel and be out of the way. When it is desired to release the clips the line is wound on the reel until all of the slack is taken up and by pressing downwardly on the handle c the line is readily released from the clip C. The line can then be slackened and the end E released from the clip C' and the whole line then wound on the reel.

The embodiment of the invention as above described is the preferred form, but it is obvious that it can be departed from to a considerable extent without departing from the spirit of the invention. As for example, the clips may be used without the reel as a fastener.

Having thus described my invention, what I claim, and desire to secure by Letters Patent, is—

1. In a device of the class described, the combination of the clips substantially V-shaped in form and so connected as to have their apexes extending in opposite directions, and the springs connecting the inner ends of the limbs of one clip with the inner ends of the limbs of the other clip, substantially as described.

2. In a device of the class described, the combination of the clips substantially V-shaped in form and so connected as to have their apexes extending in opposite directions, and the springs connecting the inner ends of the limbs of one clip with the inner ends of the limbs of the other, the said clips and connecting springs being made of a single piece of wire, substantially as described.

3. In a device of the class described, the combination of the reel and the clips adapted to secure the ends of a line to the reel, the said reel being so mounted as to be rotatable independently of the clips, substantially as described.

4. In a device of the class described, the combination of the reel, and the clips elastically connected with the said reel adapted to secure the ends of a line to the same, substantially as described.

5. In a device of the class described, the combination of the reel, and the clips substantially V-shaped in form having the inner ends of the limbs of each attached to the reel, substantially as described.

6. In a device of the class described, the combination of the springs coiled in the form of disks, the clips connected by the said springs, and the reel journaled between the said springs, substantially as described.

7. In a device of the class described, the combination of the clips substantially V-shaped in form, the springs connecting the inner ends of the limbs of one clip with the inner ends of the limbs of the other clip, the said springs being so wound as to form bearings, and the reel mounted between the said springs with the ends of its axle journaled in the bearings formed by the springs, substantially as described.

In testimony whereof I affix my signature in the presence of two witnesses.

CHARLES WAGONER.

Witnesses:
D. I. ECKERSON,
F. M. WRIGHT.